(No Model.) 2 Sheets—Sheet 1.

W. M. BOMAR.
WHEEL CULTIVATOR.

No. 544,839. Patented Aug. 20, 1895.

Witnesses.
Jas. E. Hutchinson
Geo. W. Rea.

Inventor
Wm. M. Bomar,
By James L. Norris.
Attorney.

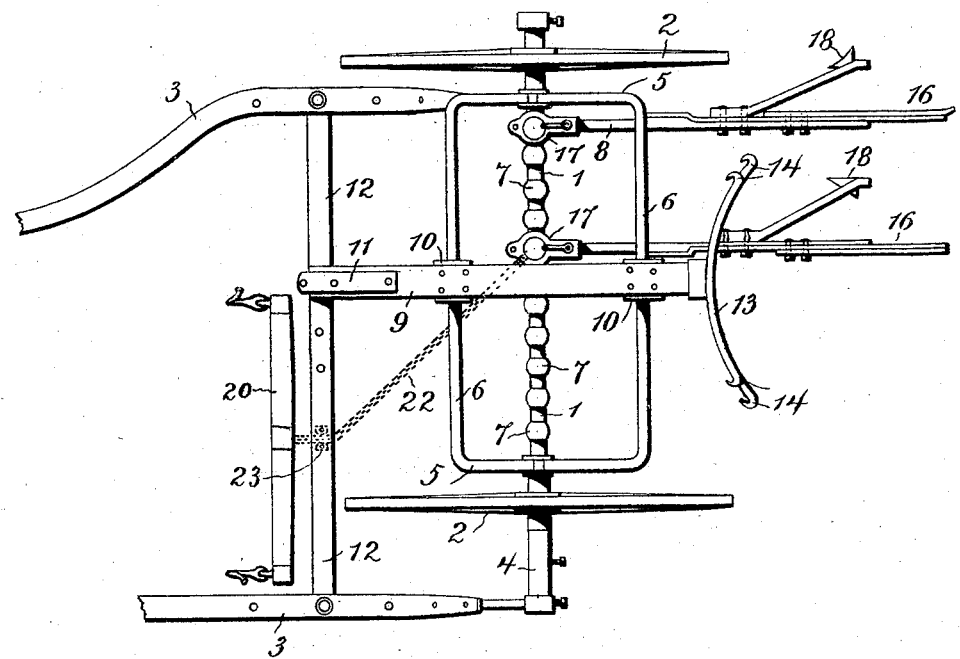

UNITED STATES PATENT OFFICE.

WILLIAM M. BOMAR, OF SPARTANBURG, SOUTH CAROLINA.

WHEEL-CULTIVATOR.

SPECIFICATION forming part of Letters Patent No. 544,839, dated August 20, 1895.

Application filed August 25, 1894. Serial No. 521,300. (No model.)

*To all whom it may concern:*

Be it known that I, WILLIAM M. BOMAR, a citizen of the United States, residing at Spartanburg, in the county of Spartanburg and State of South Carolina, have invented new and useful Improvements in Wheel-Cultivators, of which the following is a specification.

This invention relates to wheel-cultivators, and has for its objects to improve the adjustment and equalizing of the draft and the changing of the draft from one side to the other, so as to facilitate the work and readily bring the draft-animal into a central position between two rows while the cultivators are straddling one of the rows. The machine is so arranged as to be readily adapted to the use of cultivator devices of any well-known and usual character and may be quickly changed in its adjustments to adapt it to the nature of the work required.

My invention consists in the features of construction and novel combinations of parts in a sulky-cultivator, as hereinafter more particularly described and claimed.

Figure 1:
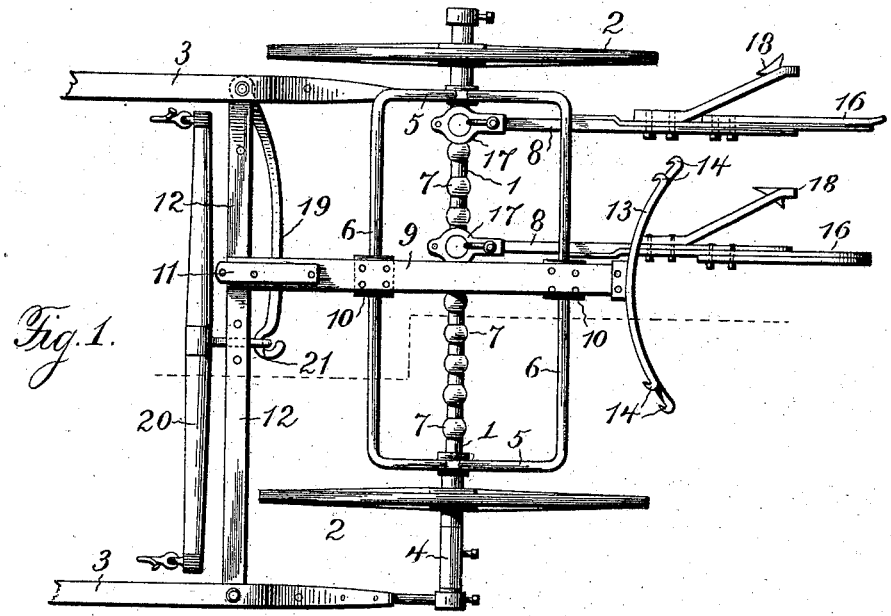
Figure 2:
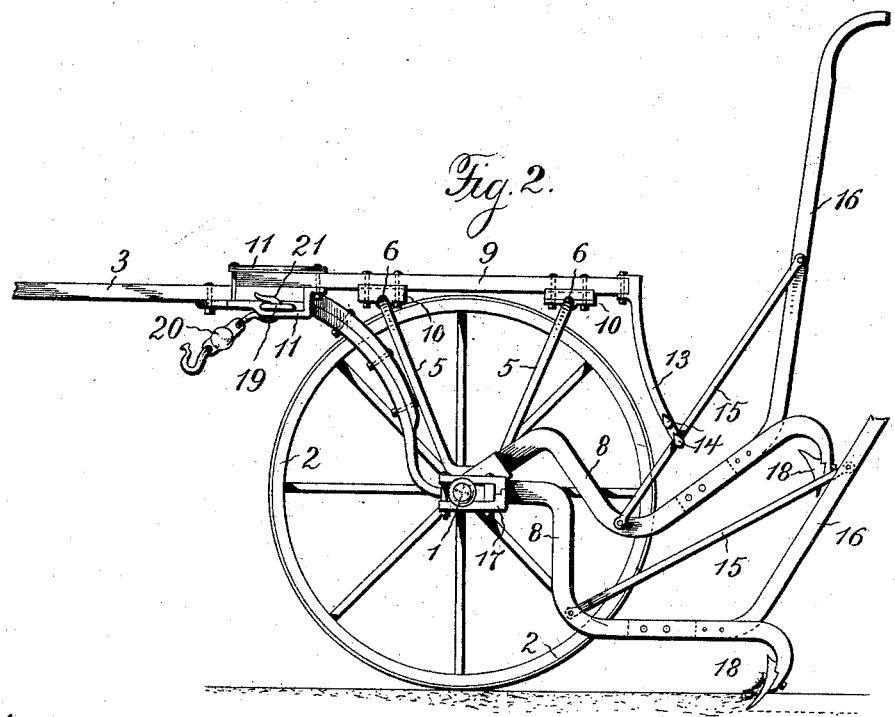

In the annexed drawings, illustrating the invention, Figure 1 is a plan of my improved cultivator. Fig. 2 is a partly sectional side elevation of the same. Fig. 3 is a view illustrating a slight modification.

Referring to the drawings, the numeral 1 designates the axle, and 2 the wheels of a sulky-cultivator. Each wheel 2 is so arranged on the axle as to be capable of adjustment inward from either end of the axle to correspond with the required position of the shafts 3, one of which is connected with the axle at a point between the two wheels, while the other is attached to the end of the axle at a point on the outer side of either wheel. Between this outermost shaft and the wheel at its inner side is an elongated collar 4, that is detachably secured to one end of the axle and may be placed on either end, as required.

Mounted on the axle 1, between the wheels 2, is a frame 5, composed of approximately V-shaped end pieces connected front and rear by transversely-arranged parallel bars 6 at the top of the frame. If preferred, the end pieces and cross-bars of this frame may be made integral. The frame 5 is adjustable longitudinally on the axle 1, according to the position to which the wheels 2 may be adjusted. For the purpose of facilitating adjustment of the wheels 2 and frame 5 on the axle 1 a series of collars 7 may be placed on the axle in position to be utilized for spacing and securing the frame and wheels and also the cultivator sweeps or beams 8, that are likewise mounted on the axle.

The transverse bars 6 of the frame 5 support a draft-beam 9, that projects both in front of and to the rear of said bars. This draft-beam 9 is adjustably secured to the bars 6 by clamps 10 in such manner that the draft-beam can be shifted along the frame toward either side of the cultivator, as desired. The forward end of the draft-beam 9 is adjustably connected in like manner by a clamp 11 to the cross-bar 12 of the shafts. On the rear end of the draft-beam 9 is secured a curved rest or support 13, that projects downward and is curved outward to both sides. The outwardly-curved ends of this support 12 may be notched or provided with claws 14 to serve as rests for the stays or braces 15 of the handles 16, through which the cultivator sweeps or beams 8 may be raised or lowered.

The cultivator sweeps or beams 8 are pivotally mounted on the axle and adjustable thereon to any required points with relation to the draft. For the purpose of attaching the sweeps or beams 8 to the axle, they may be provided with clips or boxes 17 of any suitable character. These sweeps or beams 8 may carry cultivator-points, harrow-teeth, plows, or shovels 18 of any desired kind, according to the nature of the work required. Through its handle 16 any cultivator beam or sweep may be raised or lowered, and, if desired, it may be supported away from the soil by engaging its stay or brace 15 in one of the rests 14 on the support 13 at the rear end of the draft-beam.

To one of the shafts 3 may be bolted or otherwise secured one end of a draft-bar 19, Fig. 1, the other end of which is extended beneath the forward end of the draft-beam 9 through an aperture or loop in the clamp 11, by which the draft-beam 9 and cross-bar 12 of the shafts are connected. This draft-bar 19 may be attached to either shaft, according to the required position of the draft-beam 9 and cultivators 18 with relation to the axle and wheels of the machine. The whiffletree 20 may have a hook 21 for connecting it with the hooked end of the draft-bar 19, as shown in Figs. 1 and 2.

Instead of the draft-bar 19 a chain 22, Fig. 3, may have one end secured to the axle at or near a central point between the wheels, and be extended thence upwardly and outwardly in a diagonal direction and through a guide staple, pulley, or sheave 23 on the cross-bar 12 of the shafts to the whiffletree 20, to which the forward end of the chain will be secured. It will be observed that either shaft may be connected with the end of the axle outside the adjacent wheel, either right or left, for the purpose of bringing the draft-animal into a central position between two rows while the cultivators are operating astride one of the rows. The adjustment of the wheels 2 and the supporting-frame of the draft-beam 9 is readily effected, and may be changed as required by shifting the elongated collar 4 from one end of the axle to the other, according to whether the machine is to be operated from the right or left hand. Either shaft may be somewhat bent inward, as indicated in Fig. 3, to facilitate the placing of the draft-animal in proper position. The arrangement of the collars 4 and 7 on the axle 1 afford a wide range of adjustment for the wheels 2, shafts 3, and supporting-frame 5 of the draft-beam 9 and by means of the clamps 10 and 11 the draft-beam can be readily adjusted and secured in any required position with relation to the axle and shafts. The same facility of adjustment is afforded by means of the collars 7 and clips 17, for the cultivator sweeps or beams 8, which may carry any required form of cultivating attachments or devices. The draft may be readily equalized either by means of the draft-bar 19 or the chain 22, as preferred, and it will be obvious that any required change of draft can be readily and quickly effected.

What I claim as my invention is—

1. In a wheel cultivator, the combination of the axle, the wheels, the shafts and the cultivator beams or sweeps adjustably connected with the axle, an elongated collar adapted to be placed on either end of the axle to permit attachment of either shaft to an end of the axle outside one of the wheels, and means for equalizing the draft, substantially as described.

2. In a wheel cultivator, the combination of the axle, the wheels and shafts adjustable on the axle to permit attachment of either shaft to the axle end outside one of the wheels, cultivators adjustably connected with the axle, and a draft-beam adjustably mounted on the axle between the wheels and movable to and from either wheel, substantially as described.

3. In a wheel cultivator, the combination with the axle and the adjustable wheels and shafts, of an elongated collar adapted to be detachably placed on either end of the axle to permit attachment of either shaft to an end of the axle outside one of the wheels, and a draft beam supported on the axle between the wheels and laterally adjustable to correspond with the adjustment of the wheels and shafts, substantially as described.

4. In a wheel-cultivator, the combination with the axle, the adjustable wheels and shafts, and the adjustable cultivator-beams or sweeps, of a frame adjustably mounted on the axle between the wheels, a draft-beam adjustably mounted on said frame and having its forward end adjustably clamped to the cross-bar of the shafts, and a draft-bar secured to either shaft and extended below the draft-beam and through the clip or clamp that connects the draft-beam and cross-bar of the shafts, substantially as described.

In testimony whereof I have hereunto set hand and affixed my seal in presence of two subscribing witnesses.

WILLIAM M. BOMAR. [L. S.]

Witnesses:
H. B. MITCHELL,
G. W. BOMAR.